United States Patent
Yarabolu (12) United States Patent (10) Patent No.: US 11,641,351 B2
(45) Date of Patent: *May 2, 2023

(54) SYSTEM FOR AUTHENTICATING PROCESS OPERATIONS ON A NETWORK USING CONTEXT LOCKED PROGRESSIVE SESSION TOKENS

(71) Applicant: BANK OF AMERICA CORPORATION, Charlotte, NC (US)

(72) Inventor: Vijay Kumar Yarabolu, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/483,077

(22) Filed: Sep. 23, 2021

(65) Prior Publication Data

US 2022/0014511 A1 Jan. 13, 2022

Related U.S. Application Data

(63) Continuation of application No. 16/803,282, filed on Feb. 27, 2020, now Pat. No. 11,159,514.

(51) Int. Cl.
*H04L 29/06* (2006.01)
*H04L 9/40* (2022.01)
*H04L 67/146* (2022.01)
*H04W 12/06* (2021.01)
*G06F 21/44* (2013.01)

(52) U.S. Cl.
CPC ............ *H04L 63/083* (2013.01); *G06F 21/44* (2013.01); *H04L 67/146* (2013.01); *H04W 12/06* (2013.01)

(58) Field of Classification Search
CPC ...... H04L 63/083; H04L 67/146; G06F 21/44
See application file for complete search history.

(56) References Cited

U.S. PATENT DOCUMENTS

| | | |
|---|---|---|
| 3,572,690 A | 3/1971 | Lillie |
| 3,752,157 A | 8/1973 | Malmin |
| 5,907,621 A | 5/1999 | Bachman et al. |
| 6,572,686 B1 | 6/2003 | Biernat et al. |
| 6,609,198 B1 | 8/2003 | Wood et al. |
| 6,726,339 B2 | 4/2004 | Rhoads |

(Continued)

*Primary Examiner* — Jason K Gee
(74) *Attorney, Agent, or Firm* — Moore & Van Allen PLLC; Nicholas C. Russell (57) ABSTRACT

Embodiments of the present invention provide a system for authenticating process operations on a network using context locked progressive session tokens. The system is configured for receiving a first request associated with a first process operation from a user device, authorizing the first request, generating a first session token associated with the first process operation, transmitting the first session token to the user device, wherein the first session token is used to validate a second process operation associated with the application, receiving a second request associated with the second process operation from the user device, authorizing the second request, generating a second session token associated with the second process operation using at least the first session token, and transmitting the second session token to the user device, wherein the second session token is used to validate subsequent process operation associated with the application.

20 Claims, 7 Drawing Sheets

(56) References Cited

U.S. PATENT DOCUMENTS

| | | | |
|---|---|---|---|
| 9,088,564 B1 | 7/2015 | Hobson et al. | |
| 9,112,828 B2 | 8/2015 | Wang | |
| 10,148,646 B2 | 12/2018 | Votaw et al. | |
| 2003/0084298 A1* | 5/2003 | Messerges | H04L 9/3236 713/176 |
| 2004/0059952 A1* | 3/2004 | Newport | G06Q 20/3829 726/29 |
| 2009/0113558 A1* | 4/2009 | Prabhakaran | G06F 9/4401 713/2 |
| 2010/0211799 A1* | 8/2010 | Gladstone | H04L 9/0894 713/189 |
| 2017/0091759 A1 | 3/2017 | Selfridge et al. | |
| 2018/0351936 A1 | 12/2018 | Battacharya et al. | |

\* cited by examiner

| Block | Step Description | Client Secret | Current Context | Transaction Details | Prev History(Hash /Cookie) | Session Token |
|---|---|---|---|---|---|---|
| Genesis Block(Block-0) | Authentication | ClientABC | Context1 | AuthDetails | | Hash(ClientABC + Context1 + AuthDetails + "") = Hash001 |
| Block-1 | Schedule Transfers | ClientABC | Context2 | | Hash001 | Hash(ClientABC + Context2 + "" + Hash001) = Hash002 |
| Block-2 | Schedule Transfers | ClientABC | Context3 | | Hash002 | Hash(ClientABC + Context3 + "" + Hash002) = Hash003 |
| Block-3 | Enter Details | ClientABC | Context4 | Transfer Details | Hash003 | Hash(ClientABC + Context4 + Transfer Details + Hash003) = Hash004 |
| Block-4 | Review Details | ClientABC | Context5 | | Hash004 | Hash(ClientABC + Context5 + "" + Hash004) = Hash005 |
| Block-5 | Confirm Transfers | ClientABC | Context6 | | Hash005 | Hash(ClientABC + Context6 + "" + Hash005) = Hash006 |
| Block-6 | Transfer Successful | ClientABC | Context7 | | Hash006 | Hash(ClientABC + Context7 + "" + Hash006) = Hash007 |

FIG. 7

SYSTEM FOR AUTHENTICATING PROCESS OPERATIONS ON A NETWORK USING CONTEXT LOCKED PROGRESSIVE SESSION TOKENS

CROSS-REFERENCE TO RELATED APPLICATION

The present application is a continuation of co-pending U.S. patent application Ser. No. 16/803,282, of the same title and filed on Feb. 27, 2020, which is assigned to the assignee hereof and the contents thereof are hereby expressly incorporated by reference herein.

FIELD OF THE INVENTION

The present invention relates to systems and methods for authenticating process operations on a network using context locked progressive session tokens.

BACKGROUND

Conventional systems do not have the capability to prevent the unauthorized interactions using misappropriated information. As such, there exists a need for a system that securely authenticates users and prevents unauthorized interactions using misappropriated information.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for authenticating process operations on a network using context locked progressive session tokens. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention receives a first request associated with a first process operation from a user device associated with a user, wherein the first process operation is associated with an application, wherein the first request comprises first process information, in response to receiving the first request, extracts client secret from the user device, authorizes the first request based on the first process information received from the user device, in response to authorizing the first request, generates a first session token associated with the first process operation using the first process information, the client secret, context data associated with the first process operation, transmits the first session token to the user device, wherein the first session token is used to validate a second process operation associated with the application, receives a second request associated with the second process operation from the user device, wherein the second request comprises a second process information and the first session token, in response to receiving the second request, authorizes the second request based on validating the first session token received from the user device, generates a second session token associated with the second process operation using the first session token, the client secret, context data associated with the second process operation, and the first session token, and transmits the second session token to the user device, wherein the second session token is used to validate subsequent process operation associated with the application.

In some embodiments, the first request is an authentication request and the first process operation is associated with accessing the application, wherein the first process information comprises authentication information.

In some embodiments, the client secret is a temporary cookie that is specific to the user device.

In some embodiments, the client secret is a temporary cookie that is specific to the user.

In some embodiments, the client secret is a temporary cookie that is specific to the user and the user device.

In some embodiments, the context data associated with the first process operation and the context data associated with the second process operation comprise identifiers associated with step descriptions of the first process operation and the second process operation.

In some embodiments, the user device is a mobile device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by an entity or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, conventional systems assign global identifiers to users that have access to any restricted resource associated with an entity. In a case where the global identifier is misappropriated, it may be used by an unauthorized user to perform unauthorized interactions associated with any resource, thereby opening up the resources (e.g., software resources and data associated with an entity, funds and accounts of users, or the like) to vulnerabilities. As such, there exists a need for system to prevent unauthorized interactions using misappropriated information. The system of the present invention solves the problem as explained in detail below.

Figure 1:
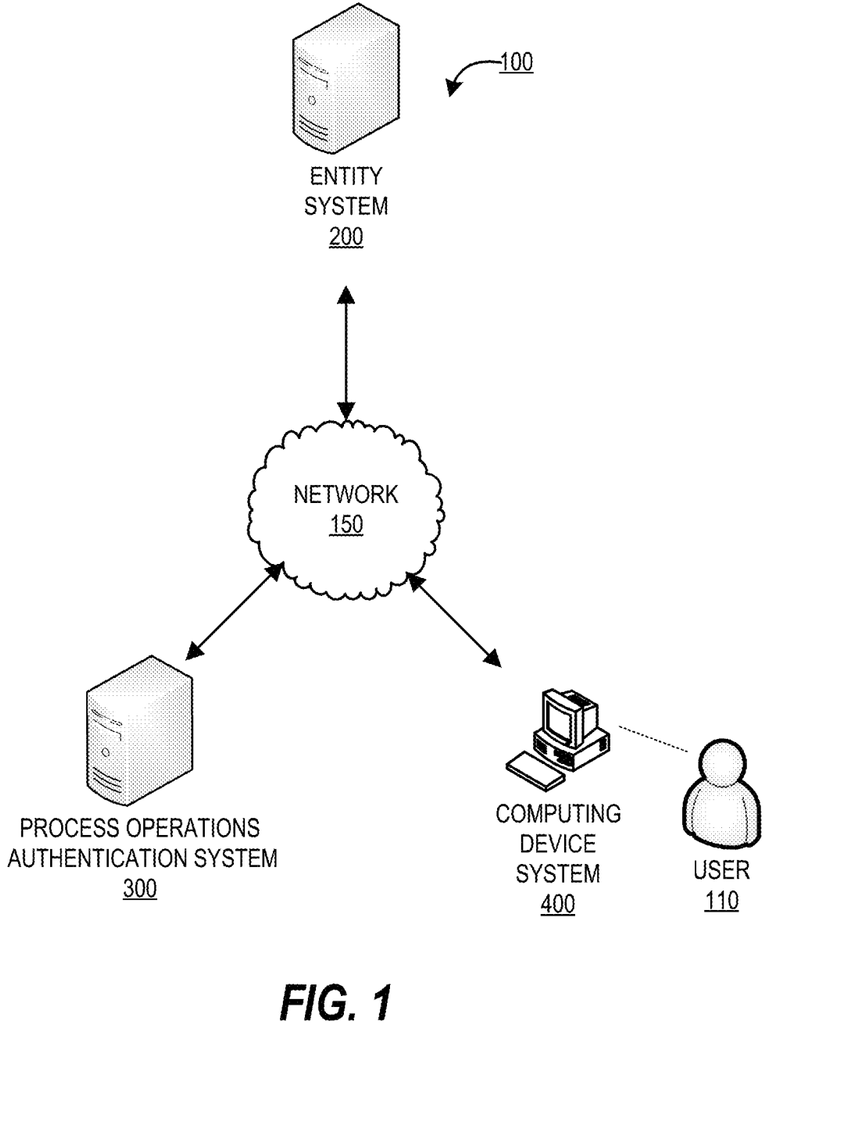
FIG. 1 provides a block diagram illustrating a system environment for authenticating process operations on a network using context locked progressive session tokens, in accordance with an embodiment of the invention.

FIG. 1 provides a block diagram illustrating a system environment 100 for authenticating process operations on a network using context locked progressive session tokens, in accordance with an embodiment of the invention. As illustrated in FIG. 1, the environment 100 includes a process operations authentication system 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be users of applications provided by an entity associated with the entity system 200. In some embodiments, the users may be customers associated with the entity and/or the process operations authentication system 300.

The entity system(s) 200 may be any system owned or otherwise controlled by an entity to support or perform one or more process steps described herein. In some embodiments, the entity is a financial institution. In such an embodiment, the one or more user(s) 110 may be customers that hold an account with the financial institution, where the financial institution maintain resources (funds) associated with the accounts of the users 110. In some embodiments, the entity is a non-financial institution. In some embodiments, the entity may be any organization that provides applications or other software resources to the users 110.

The process operations authentication system 300 is a system of the present invention for performing one or more process steps described herein. In some embodiments, the process operations authentication system 300 may be an independent system. In some embodiments, the process operations authentication system 300 may be a part of the entity system 200.

The process operations authentication system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the process operations authentication system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the process operations authentication system 300, and/or entity system 200 across the network 150.

Figure 2:
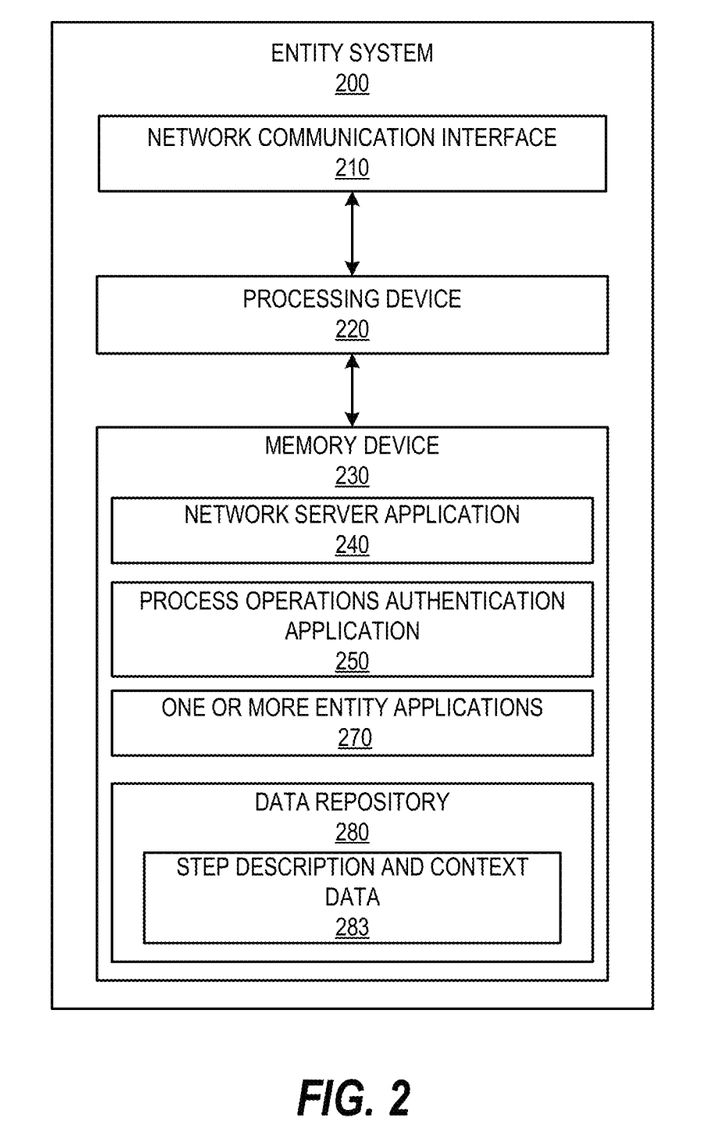
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution. In some embodiments, the entity system may be operated by any entity that is associated with developing and/or testing software program codes.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a process operations authentication application 250, one or more entity applications 270, and a data repository 280 comprising information associated with step description and/or context data 283. The computer-executable program code of the network server application 240, the process operations authentication application 250, the one or more entity application 270 to perform certain logic, data-extraction, and data-storing functions of the entity system 200 described herein, as well as communication functions of the entity system 200.

The network server application 240, the process operations authentication application 250, and the one or more entity applications 270 are configured to store data in the data repository 280 or to use the data stored in the data repository 280 when communicating through the network communication interface 210 with the process operations authentication system 300, and/or the computing device system 400 to perform one or more process steps described herein. In some embodiments, the entity system 200 may receive instructions from the process operations authentication system 300 via the process operations authentication application 250 to perform certain operations. The process operations authentication application 250 may be provided by the process operations authentication system 300. The one or more entity applications 270 may be any of the applications used, created, modified, facilitated, and/or managed by the entity system 200.

Figure 3:
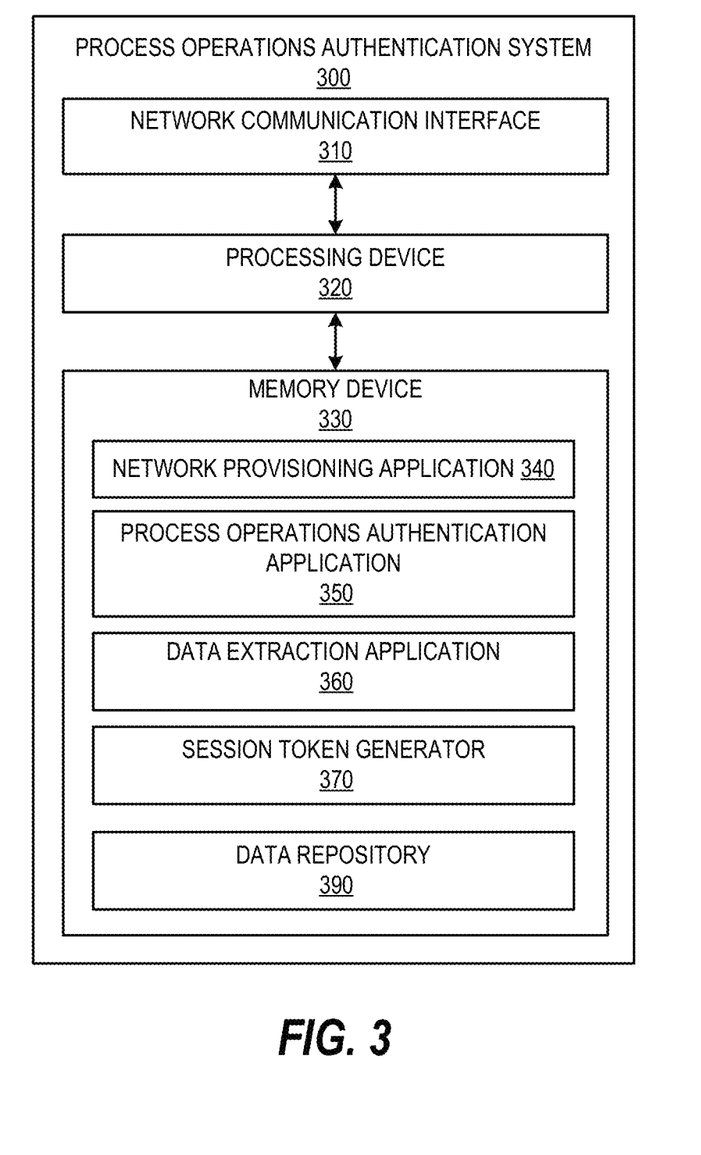
FIG. 3 provides a block diagram illustrating a process operations authentication system 300 of FIG. 1, in accordance with an embodiment of the invention.

FIG. 3 provides a block diagram illustrating the process operations authentication system 300 in greater detail, in accordance with embodiments of the invention. As illustrated in FIG. 3, in one embodiment of the invention, the process operations authentication system 300 includes one or more processing devices 320 operatively coupled to a network communication interface 310 and a memory device 330. In certain embodiments, the process operations authentication system 300 is operated by a first entity, such as a financial institution, while in other embodiments, the process operations authentication system 300 is operated by an entity other than a financial institution. In some embodiments, the process operations authentication system 300 is owned or operated by the entity of the entity system 200. In some embodiments, the process operations authentication system 300 may be an independent system. In alternate embodiments, the process operations authentication system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the process operations authentication system 300 described herein. For example, in one embodiment of the process operations authentication system 300, the memory device 330 includes, but is not limited to, a network provisioning application 340, process operations authentication application 350, a data extraction application 360, a session token generator 370, and a data repository 390 comprising data processed or accessed by one or more applications in the memory device 330. The computer-executable program code of the network provisioning application 340, the process operations authentication application 350, the data extraction application 360, and the session token generator 370 may instruct the processing device 320 to perform certain logic, data-processing, and data-storing functions of the process operations authentication system 300 described herein, as well as communication functions of the process operations authentication system 300.

The network provisioning application 340, the process operations authentication application 350, the data extraction application 360, and the session token generator 370 are configured to invoke or use the data in the data repository 390 when communicating through the network communication interface 310 with the entity system 200, and/or the computing device system 400. In some embodiments, the network provisioning application 340 the process operations authentication application 350, the data extraction application 360, and the session token generator 370 may store the data extracted or received from the entity system 200, and the computing device system 400 in the data repository 390. In some embodiments, the network provisioning application 340, the process operations authentication application 350, the data extraction application 360, and the session token generator 370 may be a part of a single application.

Figure 4:
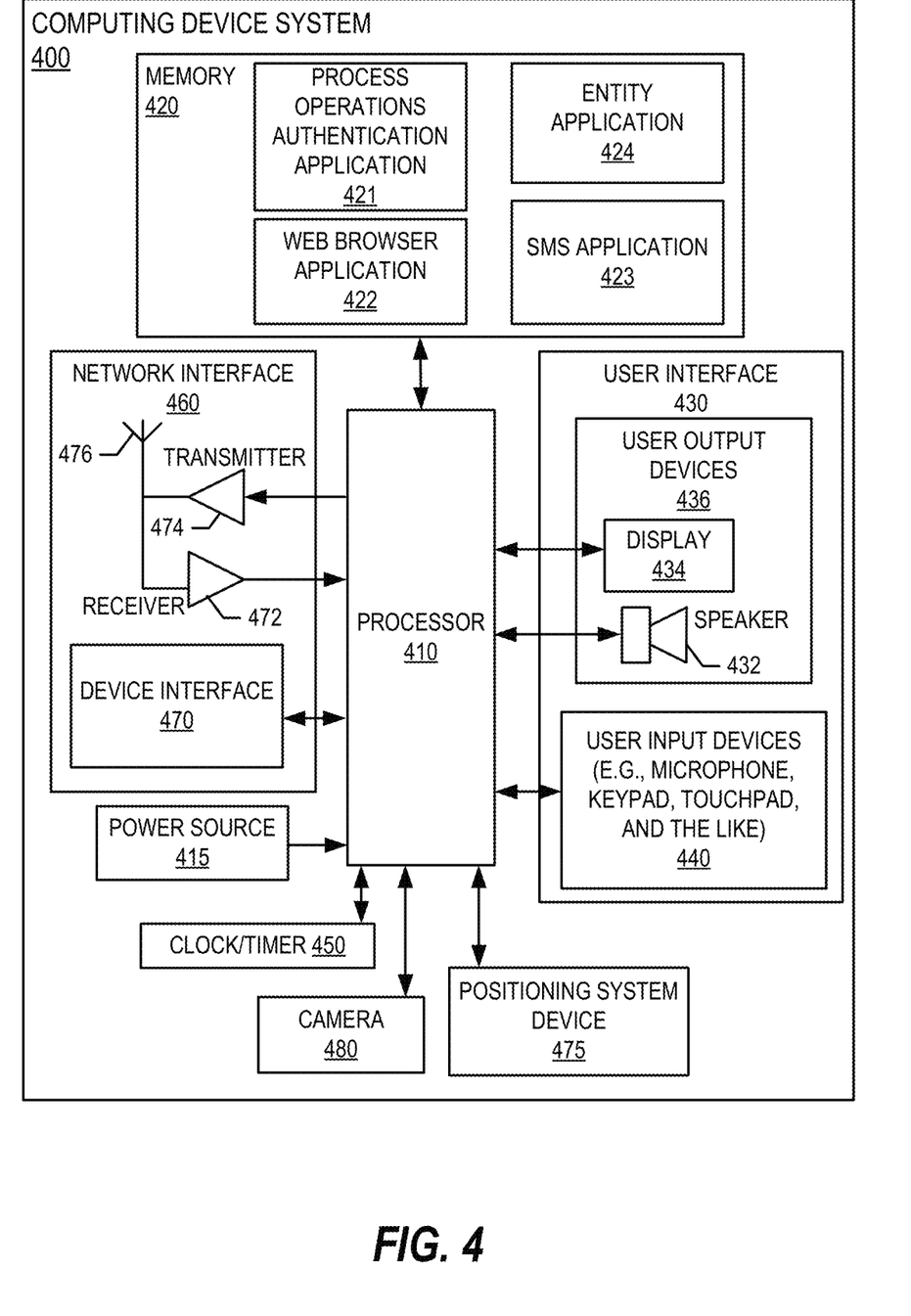
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a process operations authentication application 421, entity application 424. These applications also typically include instructions to a graphical user interface (GUI) on the display 430 that allows the user 110 to interact with the entity system 200, the process operations authentication system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the process operations authentication application 421 provided by the process operations authentication system 300 allows the user 110 to access the process operations authentication system 300. In some embodiments, the entity application 424 provided by the entity system 200 and the process operations authentication application 421 allow the user 110 to access the functionalities provided by the process operations authentication system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
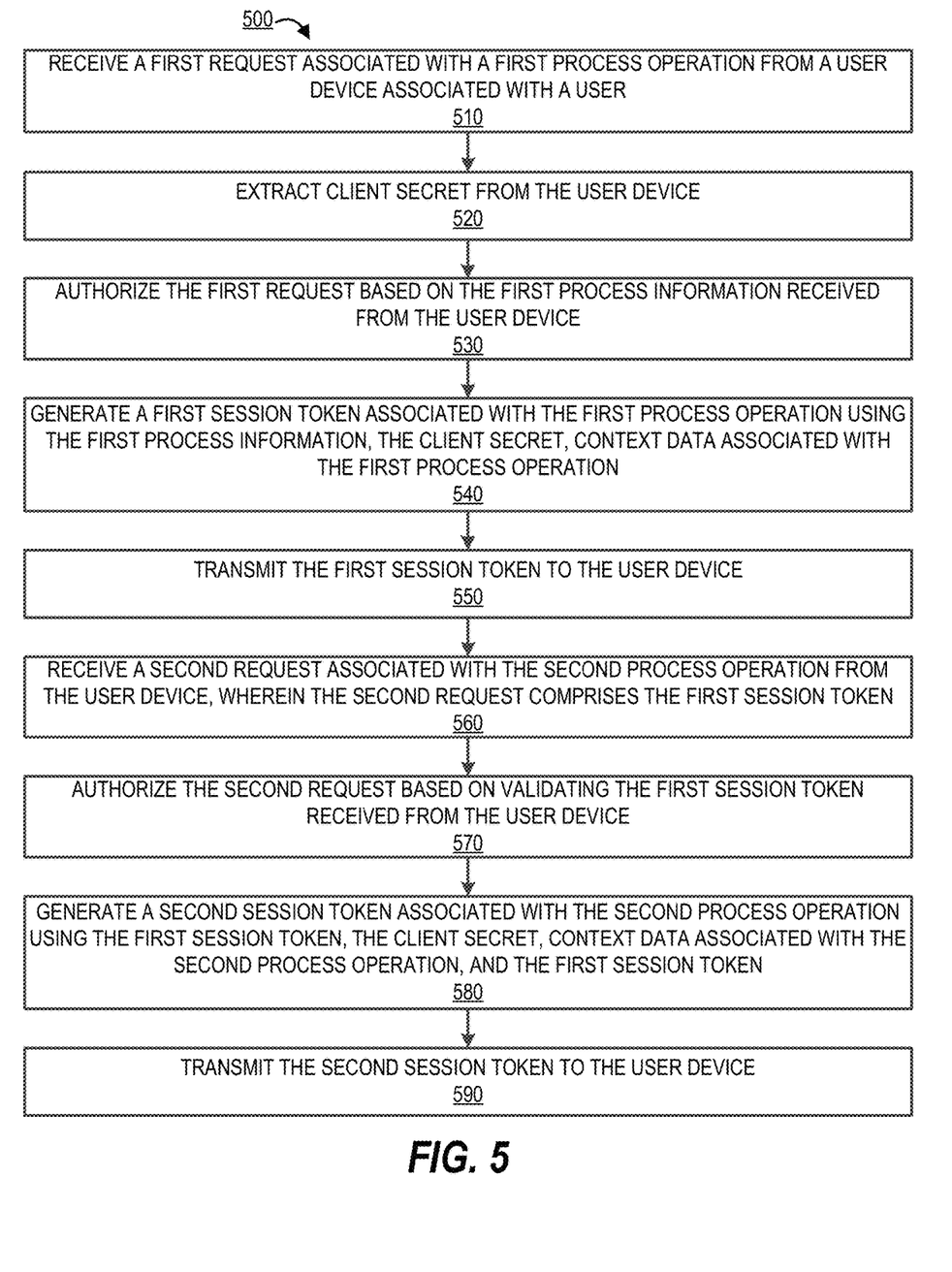
FIG. 5 provides a flowchart illustrating a process flow for authenticating process operations on a network using context locked progressive session tokens, in accordance with an embodiment of the invention.

FIG. 5 provides a flowchart illustrating a process flow 500 for authenticating process operations on a network using context locked progressive session tokens, in accordance with an embodiment of the invention.

As shown in block 510, the system receives a first request associated with a first process operation from a user device associated with a user. The first process operation may be associated with an application provided by the entity. In some embodiments, the first request comprises first process information that is associated with the first process operation. In some embodiments, the first request is an authentication request to access the application. In such an embodiment, the first request comprises authentication information. For example, if the entity is a financial institution, the first request is an authentication request to access an online banking application and the first request comprises authentication information (e.g., password, biometric information, or the like) associated with the online banking application.

As shown in block 520, the system extracts client secret from the user device. The client secret is a temporary cookie that is stored on the user device. In some embodiments, the client secret is specific to the user. In some embodiments, the client secret is specific to the user device. In some embodiments, the client secret is specific to the user device and the user. In some embodiments, the temporary cookie may be provided by the system when the application associated with the entity (e.g., online banking application) is installed on the user device. In some embodiments, the temporary cookie is generated by the process operations authentication application provided by the system that is installed on the user device.

As shown in block 530, the system authorizes the first request based on the first process information received from the user device. Continuing with the previous example, the system authorizes the authentication request based on verifying the authentication information received from the user.

As shown in block 540, the system generates a first session token associated with the first process operation using the first process information, the client secret, and context data associated with the first process operation. Continuing with the previous example, the system generates the first session token using the authentication information, the temporary cookie extracted from the user device, and an identifier that describes the authentication operation. As shown in block 550, the system transmits the first session token to the user device. The system uses the first session token to validate a second process operation associated with the application.

As shown in block 560, the system receives a second request associated with the second process operation from the user device, wherein the second request comprises the first session token. The second request may be a request to access a feature of the application. In some embodiments, the second request comprises second process information. Second process information may be any data that is associated with the second process operation.

As shown in block 570, the system authorizes the second request based on validating the first session token received from the user device. The system validates the first session token received from the user device based on comparing the first session token received from the user device with the first session token generated in block 540.

As shown in block 580, the system generates a second session token associated with the second process operation using the first session token, the client secret, context data associated with the second process operation, and the first session token. In some embodiments, the system may generate the second session token based on the second process information in combination with the first session token, the client secret, context data associated with the second process operation, and the first session token.

As shown in block 590, the system transmits the second session token to the user device. The second session token is used by the system to validate the subsequent process operation associated with the application. For example, the system uses the second session token to validate a third process operation and process described in block 560 through block 590 is repeated for subsequent process operations associated with the application.

Figure 6:
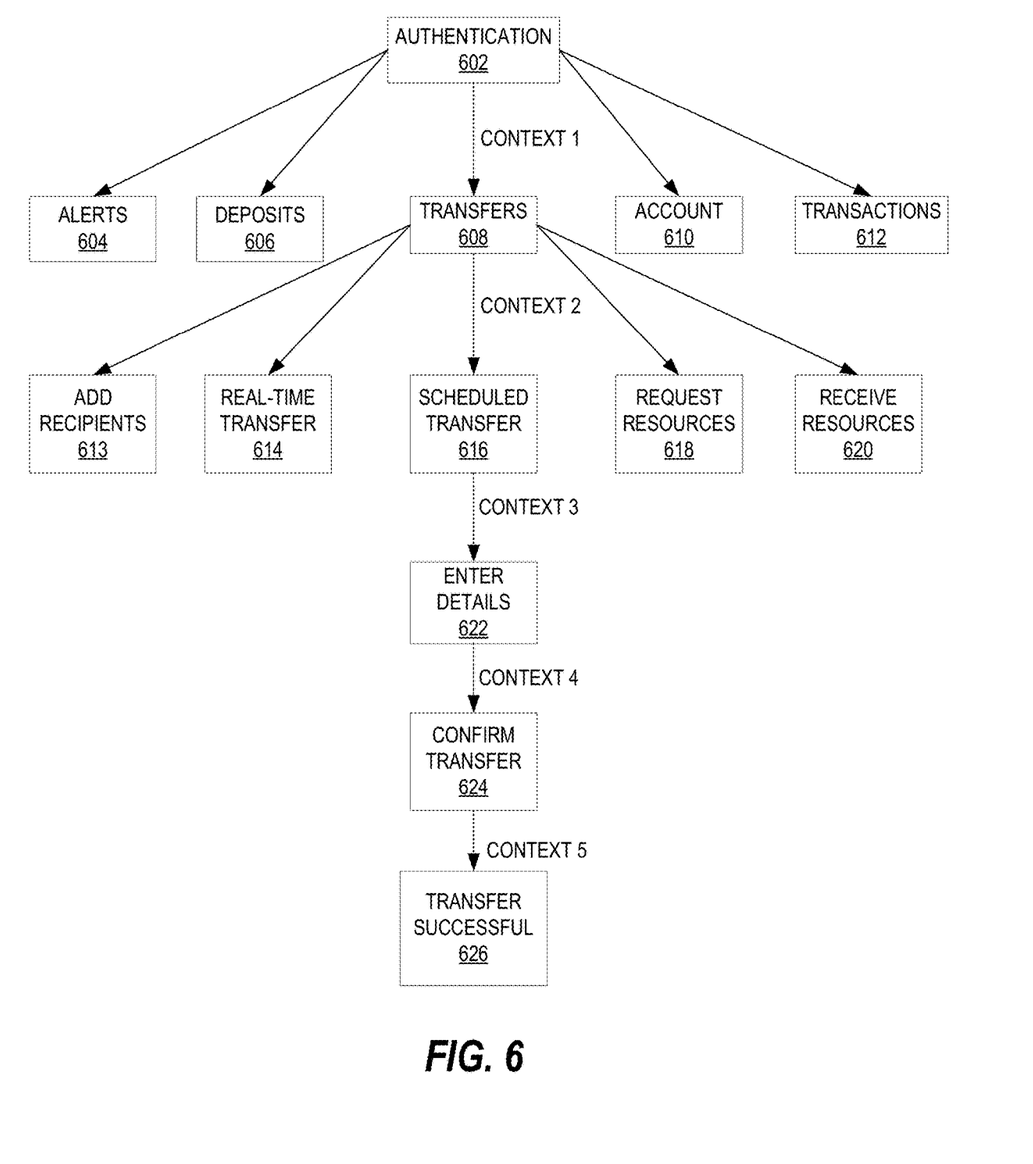
FIG. 6 provides a block diagram illustrating an example associated with authenticating process operations on a network using context locked progressive session tokens, in accordance with an embodiment of the invention.

FIG. 6 provides a block diagram illustrating an example associated with authenticating process operations using context locked progressive session tokens, in accordance with an embodiment of the invention. It should be understood that the example provided herein is for illustrative purposes only and may be applied to process operations associated with any application The block diagram 600 illustrates the process operations associated with scheduled fund transfer in an online banking application. As shown, the system may receive a request associated with authentication 602. The context 1 shown adjacent to the authentication 602 is the context data that describes the authentication operation. As such, each block associated with an operation that is illustrated in FIG. 6 comprises context data associated with it. The system uses the context 1 along with other information to generate the first session token after authentication 602. The process of generation of session tokens is described in detail in FIG. 7.

Once the first session token is generated, the system transfers the first session token to the user device. The system then receives a second request associated with any of the operations, including but not limited to, alerts 604, deposits 606, transfers 608, account 610, and transactions 612, where the second request comprises the first session token that was transmitted to the user device by the system. The second request is shown as being associated with transfers 608 in FIG. 6 for illustration purposes only. Once the system receives the second request associated with transfer, the system authorizes the transfer based on validating the first session token. Next, the system generates a second session token after authorizing the transfer using at least context 2 that is associated with transfers 608. In the case where the second request is associated with deposits 606, context data associated with the deposits 606 will be used to generate the second session token which is then transferred to the user device. In such an embodiment, the subsequent progressive tokens that are generated will differ from the tokens that are illustrated in FIG. 7 and the process operations will differ from the process operations that are illustrated in FIG. 6.

Next, the system receives a third request that is associated with any of the operations, including but not limited to, add recipients 613, real-time transfer 614, scheduled transfer 616, request resources (funds) 618, receive resources (funds) 620, as illustrated. The third request comprises the second session token that was transmitted to the user device by the system. The third request is shown as being associated with scheduled transfer 616 in FIG. 6 for illustrative purposes only. The process of generating progressive context locked session tokens continues as illustrated in FIG. 6 (e.g., entering details 622 using context 4, confirming transfer 624 using context 5, until the transfer is successful as shown in block 626).

Figure 7:
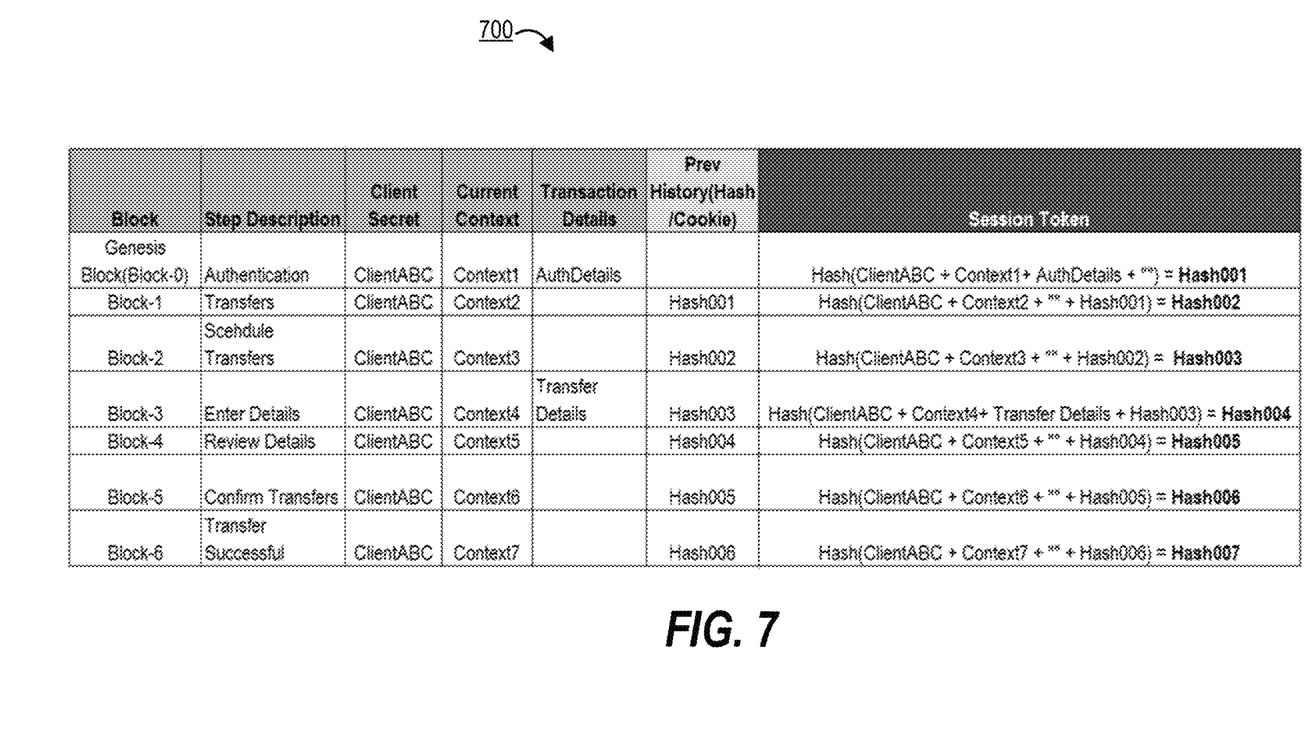
FIG. 7 illustrates the generation of context locked progressive session tokens, in accordance with an embodiment of the invention.

FIG. 7 illustrates the generation of context locked progressive session tokens, in accordance with an embodiment of the invention. As shown, the first session token is generated using the client secret, context 1, and authentication details which is used to validate the second process operation. The context changes based on the type of operation that is user is performing and, in some embodiments, the context data associated with every operation associated with multiple application is present in the entity system. In some embodiments, the system may identify the type of operation that the user is trying to perform and may generate the context in real-time and store it in the database for future use. As illustrated in FIG. 7, each of the session tokens that are generated by the system are progressive and cannot be used for performing any other operations. For example, the session token that is associated with block '2' cannot be used to validate any other operation. In some embodiments, the system may generate the session token including any additional information that is received with a corresponding request. For example, as shown the system generates a session token that is associated with block '3' using the transfer details provided by the user. The session tokens generated by the system are unique to each operation and subsequent operations that follow the first operation, thereby preventing the use of session tokens for performing different operations in the case a token is misappropriated. The session tokens generated by the system also include historical operation data via the historical session tokens that are used for generating the current session tokens. Additionally, the session tokens generated by the system are unique to a user and/or a user device, thereby preventing the use of tokens from a different user device.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for authenticating process operations on a network using context locked progressive session tokens, the system comprising:
at least one network communication interface;
at least one non-transitory storage device; and
at least one processing device coupled to the at least one non-transitory storage device and the at least one network communication interface, wherein the at least one processing device is configured to:
receive a first request associated with a first process operation from a user device associated with a user, wherein the first process operation is associated with an application, wherein the first request comprises first process information;
in response to receiving the first request, extract client secret from the user device;
authorize the first request based on the first process information received from the user device;
in response to authorizing the first request, generate a first session token associated with the first process operation using the first process information, the client secret, context data associated with the first process operation;
transmit the first session token to the user device, wherein the first session token is used to validate a second process operation associated with the application;
receive a second request associated with the second process operation from the user device, wherein the second request comprises a second process information and the first session token;
in response to receiving the second request, authorize the second request based on validating the first session token received from the user device; and
generate a second session token associated with the second process operation using the first session token, the client secret, context data associated with the second process operation, and the first session token, wherein the second session token is used to validate subsequent process operations associated with the application.

2. System of claim 1, wherein the first request is an authentication request and the first process operation is associated with accessing the application, wherein the first process information comprises authentication information.

3. The system of claim 1, wherein the client secret is a temporary cookie that is specific to the user device.

4. The system of claim 1, wherein the client secret is a temporary cookie that is specific to the user.

5. The system of claim 1, wherein the client secret is a temporary cookie that is specific to the user and the user device.

6. The system of claim 1, wherein the context data associated with the first process operation and the context data associated with the second process operation comprise identifiers associated with step descriptions of the first process operation and the second process operation.

7. The system of claim 1, wherein the user device is a mobile device.

8. A computer program product for authenticating process operations on a network using context locked progressive session tokens, the computer program product comprising a non-transitory computer-readable storage medium having computer executable instructions for causing a computer processor to perform the steps of:
receiving a first request associated with a first process operation from a user device associated with a user, wherein the first process operation is associated with an application, wherein the first request comprises first process information;
in response to receiving the first request, extracting client secret from the user device;
authorizing the first request based on the first process information received from the user device;
in response to authorizing the first request, generating a first session token associated with the first process operation using the first process information, the client secret, context data associated with the first process operation;
transmitting the first session token to the user device, wherein the first session token is used to validate a second process operation associated with the application;
receiving a second request associated with the second process operation from the user device, wherein the second request comprises a second process information and the first session token;
in response to receiving the second request, authorizing the second request based on validating the first session token received from the user device; and
generating a second session token associated with the second process operation using the first session token, the client secret, context data associated with the second process operation, and the first session token, wherein the second session token is used to validate subsequent process operation associated with the application.

9. The computer program product of claim 8, wherein the first request is an authentication request and the first process operation is associated with accessing the application, wherein the first process information comprises authentication information.

10. The computer program product of claim 8, wherein the client secret is a temporary cookie that is specific to the user device.

11. The computer program product of claim 8, wherein the client secret is a temporary cookie that is specific to the user.

12. The computer program product of claim 8, wherein the client secret is a temporary cookie that is specific to the user and the user device.

13. The computer program product of claim 8, wherein the context data associated with the first process operation and the context data associated with the second process operation comprise identifiers associated with step descriptions of the first process operation and the second process operation.

14. The computer program product of claim 8, wherein the user device is a mobile device.

15. A computer implemented method for authenticating process operations on a network using context locked progressive session tokens, wherein the method comprises:
receiving a first request associated with a first process operation from a user device associated with a user, wherein the first process operation is associated with an application, wherein the first request comprises first process information;
in response to receiving the first request, extracting client secret from the user device;

authorizing the first request based on the first process information received from the user device;

in response to authorizing the first request, generating a first session token associated with the first process operation using the first process information, the client secret, context data associated with the first process operation;

transmitting the first session token to the user device, wherein the first session token is used to validate a second process operation associated with the application;

receiving a second request associated with the second process operation from the user device, wherein the second request comprises a second process information and the first session token;

in response to receiving the second request, authorizing the second request based on validating the first session token received from the user device; and generating a second session token associated with the second process operation using the first session token, the client secret, context data associated with the second process operation, and the first session token, wherein the second session token is used to validate subsequent process operation associated with the application.

16. The computer implemented method of claim 15, wherein the first request is an authentication request and the first process operation is associated with accessing the application, wherein the first process information comprises authentication information.

17. The computer implemented method of claim 15, wherein the client secret is a temporary cookie that is specific to the user device.

18. The computer implemented method of claim 17, wherein the client secret is a temporary cookie that is specific to the user.

19. The computer implemented method of claim 18, wherein the client secret is a temporary cookie that is specific to the user and the user device.

20. The computer implemented method of claim 19, wherein the context data associated with the first process operation and the context data associated with the second process operation comprise identifiers associated with step descriptions of the first process operation and the second process operation.

* * * * *